Nov. 15, 1938.　　　　C. A. CAMPBELL　　　　2,136,582
AIR BRAKE
Original Filed April 17, 1936　　6 Sheets-Sheet 2
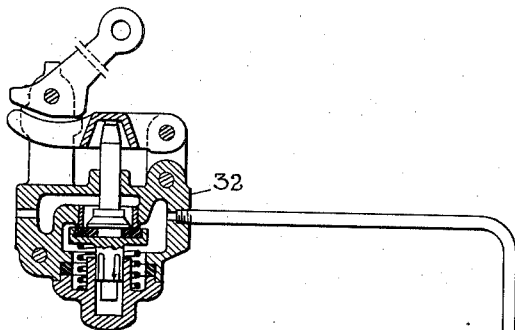
Fig. 3
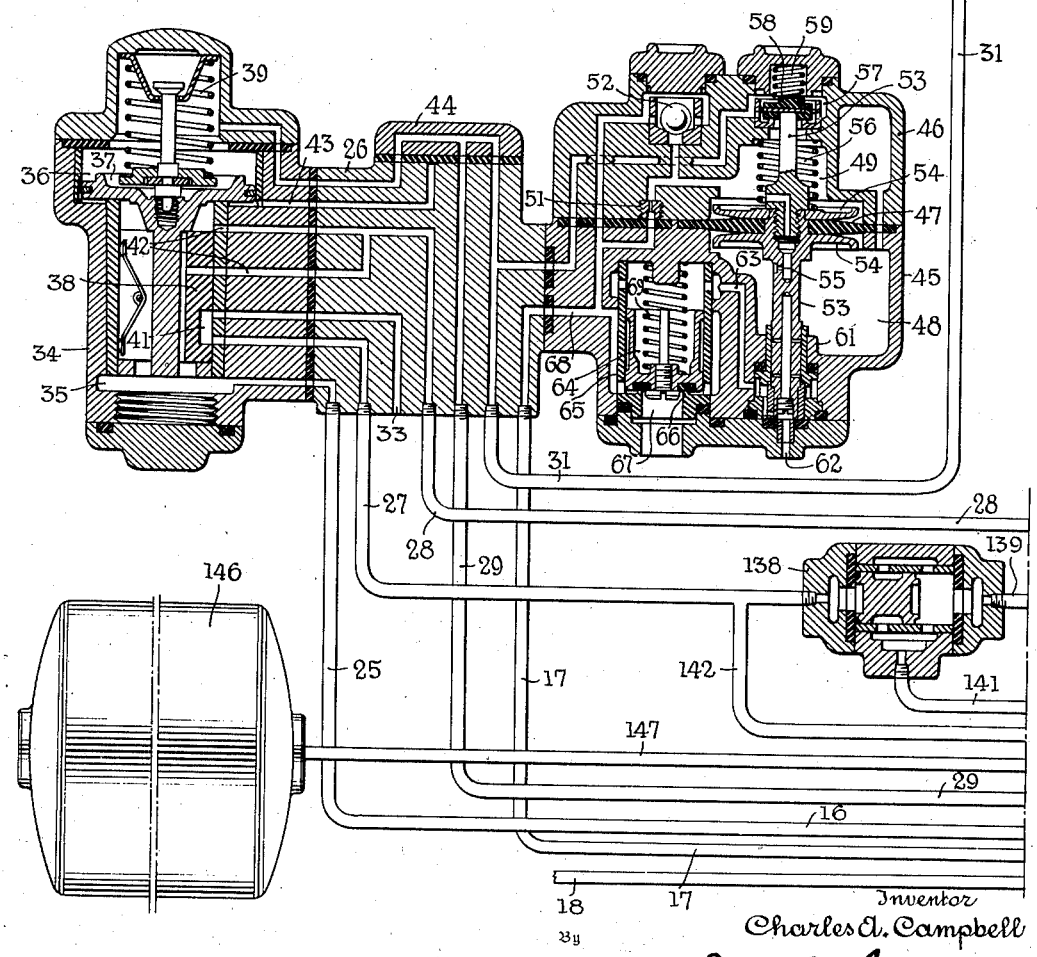
Inventor
Charles A. Campbell
By
Dodge
Attorneys Nov. 15, 1938.  C. A. CAMPBELL  2,136,582
AIR BRAKE
Original Filed April 17, 1936  6 Sheets-Sheet 3

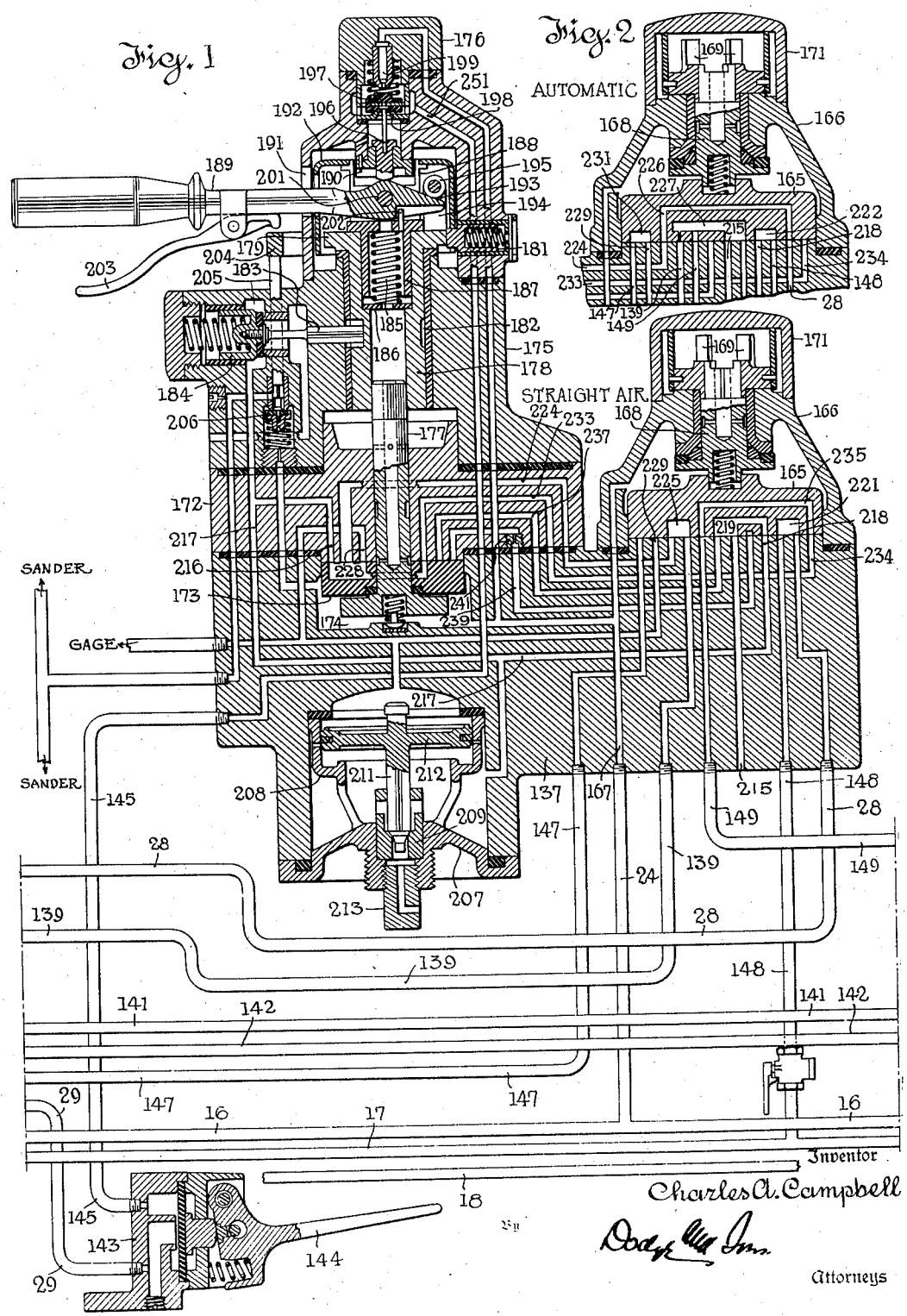

Inventor
Charles A. Campbell
By
Attorneys

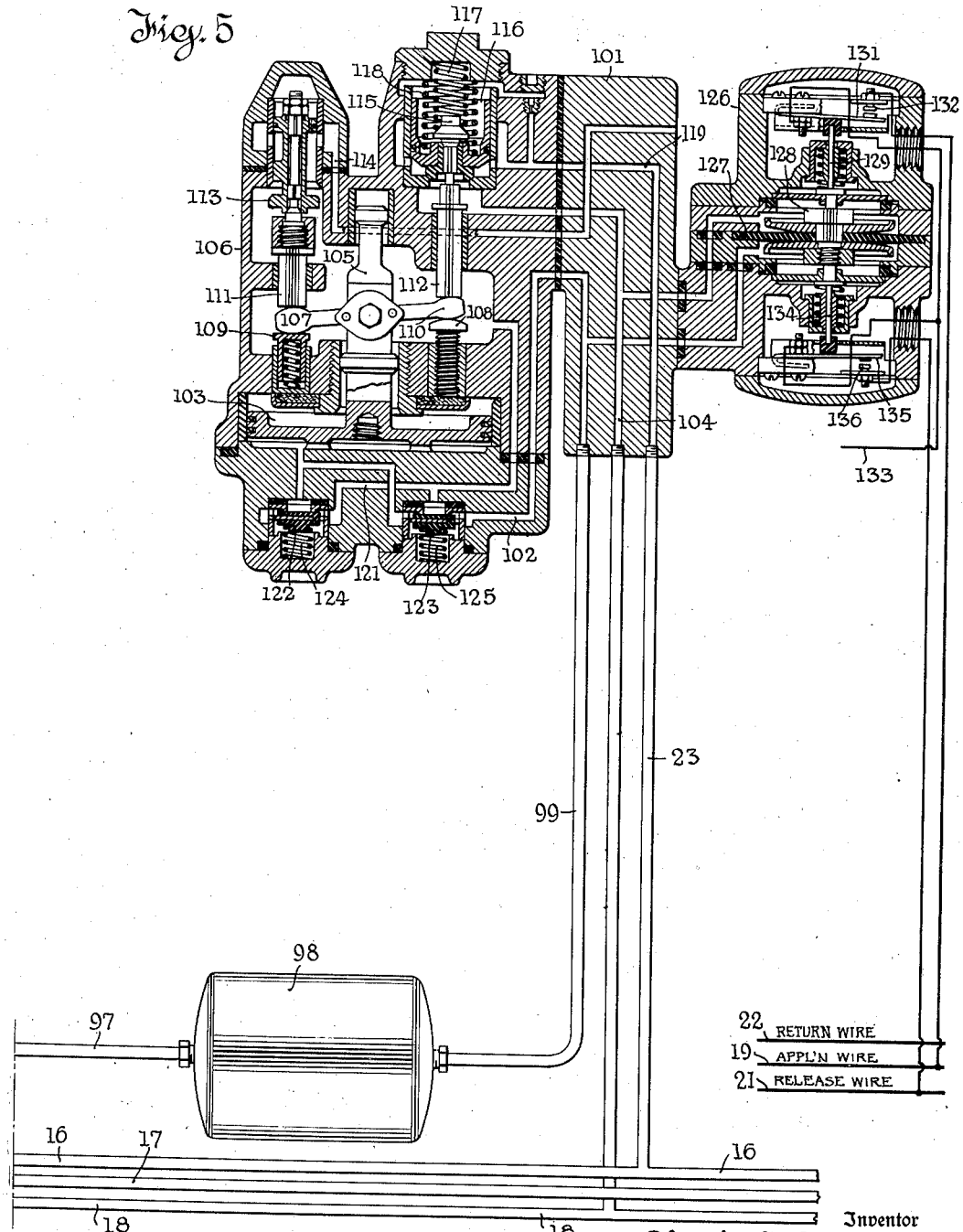

Nov. 15, 1938.     C. A. CAMPBELL     2,136,582
AIR BRAKE
Original Filed April 17, 1936     6 Sheets-Sheet 5
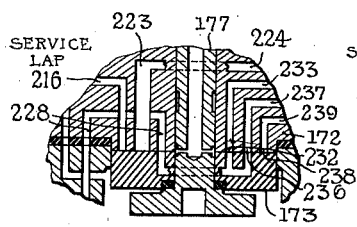
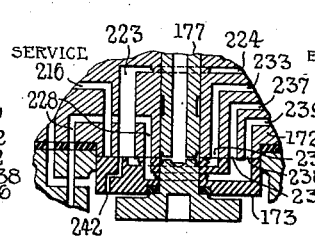
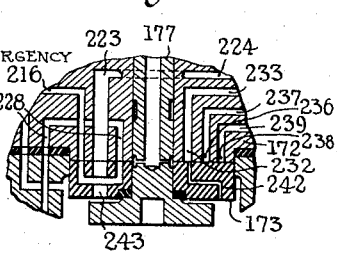
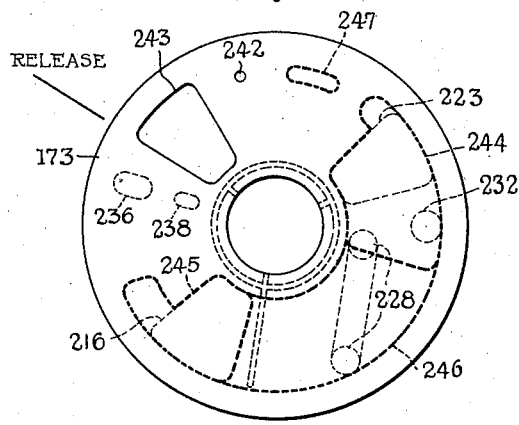
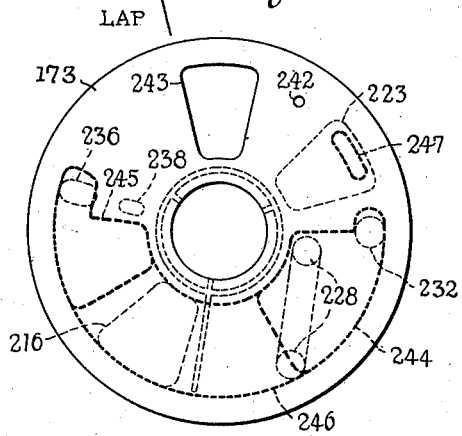
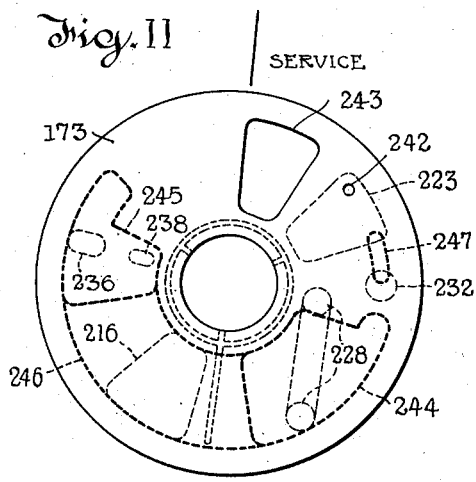
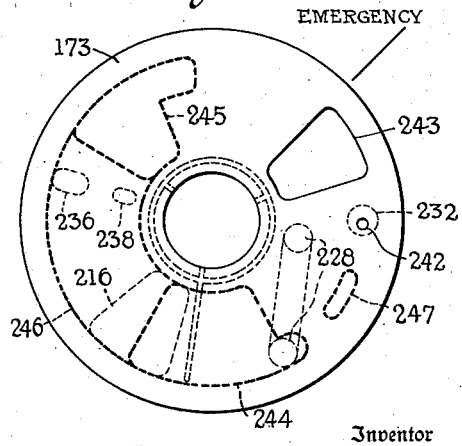
Inventor
Charles A. Campbell
By Dodge and Sons,
Attorneys

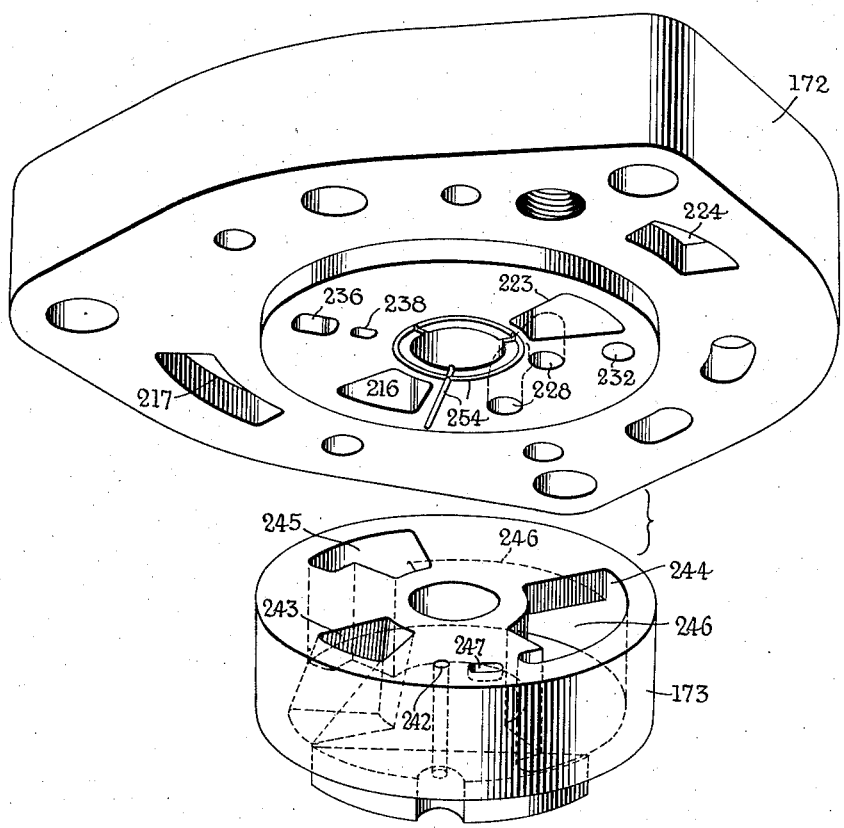

UNITED STATES PATENT OFFICE 2,136,582

AIR BRAKE

Charles A. Campbell, Watertown, N. Y., assignor to The New York Air Brake Company, a corporation of New Jersey Application April 17, 1936, Serial No. 75,004
Renewed March 2, 1938

42 Claims. (Cl. 303—26)

This invention relates to air brakes and particularly to engineer's brake valves. The principal object of the invention is to provide an engineer's brake valve which may readily be set to control automatic air brakes of the single brake pipe type now standard, for example, on conventional passenger trains, or to control straight air systems and particularly the two pipe deceleration controlled electro-pneumatic system known as the "Schedule H. S. C. High Speed Brake Equipment". This is now coming into extensive use on light weight high speed trains. Instruction Pamphlet 34 of The New York Air Brake Company describes the H. S. C. system and is on file in Division 4 of the Patent Office.

An important feature of the invention is that the engineer's brake valve has the same functional positions for "straight air" operation that it has for automatic operation, and is manipulated in the same way whether set for "straight air" or for "automatic" characteristics. These positions are: release, lap, service, and emergency.

The change of operative characteristics is effected by a manually set changeover valve, which by changing the connections of the seat ports in the rotary valve of the engineer's brake valve, conditions the brake valve to function either as an equalizing discharge valve for automatic brakes or as a straight air valve.

A valuable feature of the changeover valve is that it is shiftable only by the removable operating handle of the engineer's brake valve, which may be removed only in a brake applying position (preferably service), and may then be inserted to shift the changeover valve. When so inserted it may be withdrawn only when the changeover valve is in "straight air" position or "automatic" position.

The need for a convertible engineer's brake valve of uniform manipulative characteristics is substantial.

Prior to the development of high speed deceleration controlled brakes, all passenger trains in the United States used single pipe automatic systems. The high speed trains were originally intended for a distinct class of passenger service, and interchange was not contemplated because the diesel-electric propelling unit was an integral part of the articulated train.

Soon the development took a new trend. The diesel electric propelling units became independent locomotives releasably coupled to the articulated train and became so large and powerful that economical use of equipment demanded their occasional use to haul standard coaches equipped with single pipe automatic brakes. Similarly it must be possible occasionally to haul the articulated trains with conventional steam locomotives equipped only with controls for automatic brakes.

The latter requirement was met in the Schedule H. S. C. brake, by using triple valves responsive to brake pipe (supervisory line) pressure as a part of the brake valve equipment. As a consequence H. S. C. equipment can be controlled on the single pipe automatic principle.

The present invention permits the engineer on a diesel locomotive equipped with Schedule H. S. C. brakes, to control a train equipped with single pipe automatic brakes. It also permits him to control the brakes on a train equipped with Schedule H. S. C. brakes in either of two ways: (1) as a two pipe electro-pneumatic system with deceleration control or (2) as a one pipe automatic system, in which event the deceleration control and the electric features cease to function.

In this way complete interchangeability of equipment is secured so that all requirements of railroad operation are met.

While the novel features of the present invention reside primarily in the engineer's brake valve, there are important relationships between this and a combined application and vent valve, and between the brake valve and the deceleration controller. To explain fully the functions of the parts it is necessary to show the whole control system between the main reservoir connection on the one hand and the brake pipe (supervisory line) and the straight air pipe (control line) on the other hand. This control system can be substituted for functionally similar parts in Fig. 58 of pamphlet 34, above identified.

Referring to designations on Fig. 58 just mentioned, there is substituted for the 5—A vent valve, the application and vent valve described and claimed in my application Serial No. 39,871, filed September 9, 1935. For the M—38 brake valve is substituted the valve of the present invention. The deceleration controller identified on Fig. 58 by the trade-mark "Decelakron" is described in detail and claimed in my application Serial No. 724,990, filed May 10, 1934. The EP—2 master relay valve, embodies operative principles and at least in part embodies structures described and claimed in my application Serial No. 724,989, filed May 10, 1934.

Referring now to the drawings forming part of the present application,—

Fig. 1 is a vertical axial section through the engineer's brake valve forming the subject of the present invention. Connected pipes are shown in diagram. The valve is in release position. The changeover valve is in straight air position.

Fig. 2 is a view showing the changeover valve in "automatic" position.

Fig. 3 is a vertical axial section through the combined application and vent valve, in normal or running position. Piping and accessory apparatus are shown in diagram.

Fig. 5 is a vertical axial section through the electro-pneumatic master relay, the piping being shown in diagram.

Figure 4:
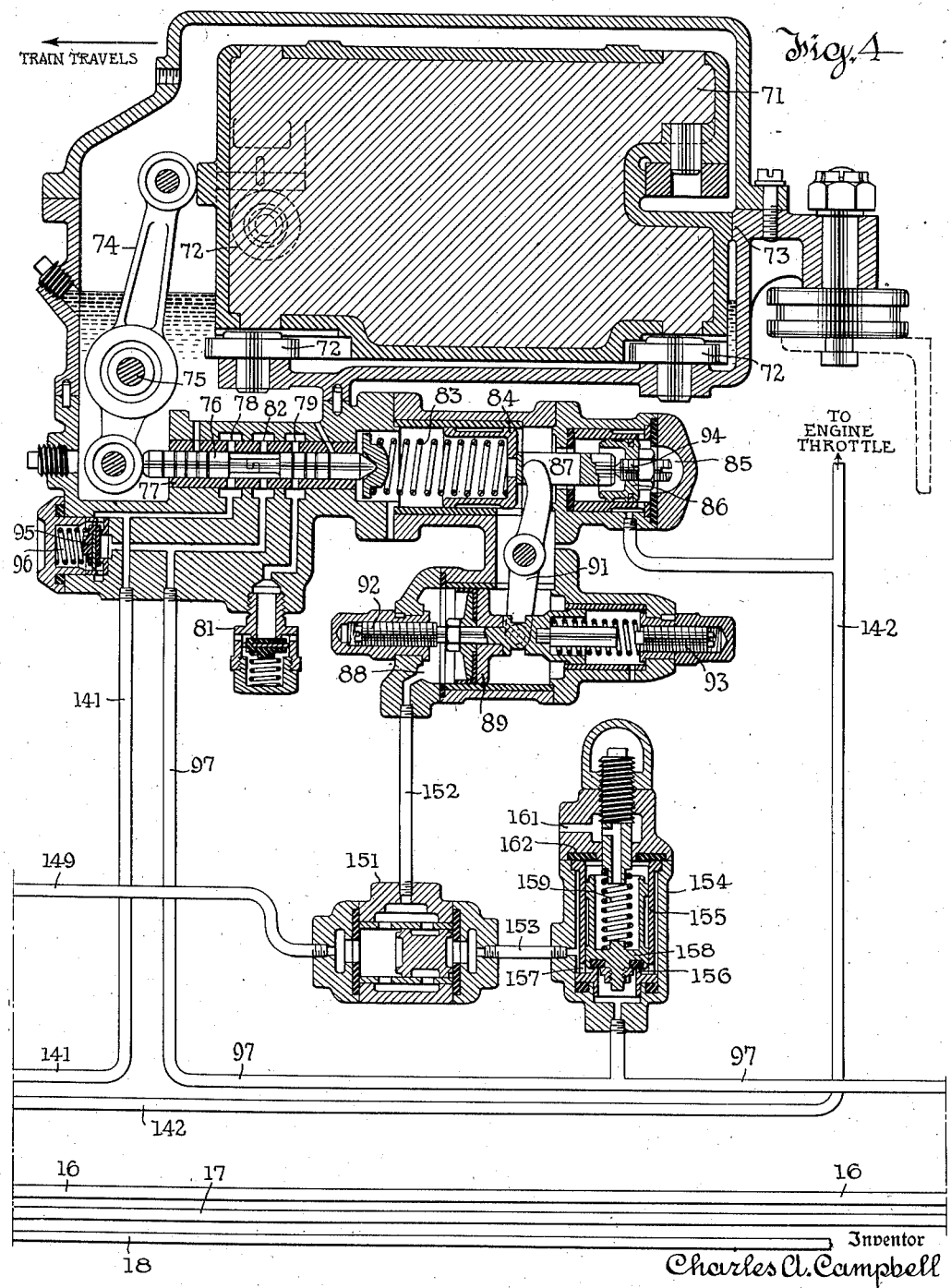
Fig. 4 is a vertical axial section through the deceleration controller, the piping being shown in diagram.

Note.—By assembling Figs. 3, 1, 4 and 5, in the order stated from left to right a diagram of the control system is formed.

Fig. 6 is a fragmentary view similar to a portion of Fig. 1 but showing the rotary valve of the engineer's brake valve in service lap position.

Fig. 7 is a similar view showing service position.

Fig. 8 is a similar view showing emergency position.

In all the above figures the ports are shown diagrammatically as if they lay in a single plane. In Figs. 9 to 13 actual porting of the rotary valve and seat are shown.

Fig. 9 is a diagram looking upward at the rotary valve in release position. Seat ports are indicated in fine broken lines. Cavities in the face of the rotary valve are indicated in coarse broken lines. Through ports in the rotary valve are indicated in full lines.

Fig. 10 is a similar view showing lap position.

Fig. 11 is a similar view showing service position.

Fig. 12 is a similar view showing emergency position.

Fig. 13 is a perspective view of the rotary valve and its seat, separated from one another.

As above stated, the mechanism to be described in the present application is interposed between the pressure fluid supply and the two train pipes. The electro-pneumatic feature, whose use is optional, also involves three train wires, namely an application wire, a release wire and a return wire.

In the drawings the pressure fluid supply is typified by the main reservoir pipe 16. In practice it is fed through a large capacity pressure reducing feed valve (not shown) from a source maintained at a superior pressure. It should be observed that no feed valve is associated with the engineer's brake valve, and the functions characteristic of release position and running position in ordinary equalizing discharge brake valves are performed by a single release and running position (Fig. 9).

The normally charged brake pipe (supervisory line) 17 and the normally vented straight air pipe (control line) 18 run throughout the length of the train and to them are connected the brake applying valves, not shown, but made up of a triple valve subject to brake pipe pressure, and a relay controllable selectively by pressure developed in the straight air pipe and pressure developed by operation of the associated triple valve, as the case may be. Local reservoirs charged from the brake pipe are used on the cars. The application wire is shown at 19, the release wire at 21, and the return wire at 22, and these circuits control application and release magnet valves associated with each brake applying valve. This scheme is used in the H. S. C. brake and fully described in pamphlet 34.

Basically, however, the requirements of the system, so far as the present invention is concerned, are that the brakes can be applied and released respectively by reducing and restoring pressure in the normally charged brake pipe 17 or by developing pressure in and venting the normally vented straight air pipe 18. These are the functions of the novel brake valve (Fig. 1) both independently and in association with the application and vent valve (Fig. 3).

Three branches lead from the main reservoir pipe 16. The first branch 23 leads to the master relay mechanism (Fig. 5) and at times supplies at least a part of the air for charging the straight air pipe to produce a straight air application.

The second branch 24 leads to the brake valve and supplies air to hold the changeover valve and the rotary valve to their seats, supplies air through the rotary valve to the control chamber in straight air service and emergency applications, charges the deadman connections and supplies air for the sander associated with the brake valve. It does not, however, supply air to charge the brake pipe 17 under either straight air or automatic conditions.

This last charging flow occurs by way of the third branch 25 to and through the application valve to the changeover valve. The application valve functions in emergency applications, produced, for example, by the deadman valve or conductor's valve (in both straight air and automatic settings of the changeover valve) to interrupt the feed to the brake pipe so that under no circumstances can the feed to the brake pipe then occur and resist the desired emergency reduction or cause undesired release after the vent valve closes. This feeding flow is from the application valve to a seat port in the changeover valve. As indicated in Fig. 1, under straight air conditions the feeding flow passes directly through the changeover valve to the brake pipe, whereas as indicated in Fig. 2, under automatic conditions, the feeding flow is through the changeover to the rotary valve of the engineer's brake valve which closes the feeding path except when in release position.

From the above, it follows that there is a direct operative relationship between the application and vent valve of Fig. 3 and the engineer's brake valve of Fig. 1.

The deceleration controller of Fig. 4 includes rate varying means controlled in part by the application and vent valve of Fig. 3 and by the brake valve of Fig. 1. To illustrate these connections Fig. 4 is included, but deceleration control is not always indispensable. The present invention can be used without it. Its omission implies the omission of the rate varying means.

The master relay mechanism of Fig. 5 greatly accelerates the response of the brakes and hence is considered essential on long trains. It also stabilizes the action of the brakes in response to manipulation of the brake valve and to action of the deceleration controller (if used), irrespective of the length of the train. On short trains and particularly single car units it might be omitted.

So far as the broad aspects of the present invention are concerned the mechanisms shown in Figs. 4 and 5 either or both may be omitted. They are included in the interest of a complete disclosure. Their inclusion stabilizes the performance of the engineer's brake valve in applying and releasing brakes under straight air conditions, particularly where the length of the train is variable. Under automatic conditions the equalizing discharge mechanism has a similar stabilizing effect in service applications. There is thus a cooperative relationship with the engineer's brake valve here disclosed.

Referring first to Fig. 3, 26 is a pipe bracket to which all pipe connections to the application and vent valve are made, including branch 25 and brake pipe 17. In addition to these the connected pipes are emergency pipe 27, brake pipe feed line 28, deadman pipe 29 and conductor's valve pipe 31 which leads to the normally closed conductor's valve 32 of ordinary form. In bracket 26 is also an exhaust port 33.

Body 34 mounted on bracket 26 houses the application valve. The body encloses a slide valve chamber 35 and a cylinder 36 in which last works a piston 37 connected to shift the slide valve 38. Main reservoir pipe 16 is connected by branch 25 and a communicating passage with valve chamber 35. Deadman pipe 29 and conductor's valve pipe 31 communicate with passages which merge and lead to the space on the outer (upper) side of piston 37. A coil compression spring 39 urges the piston 37 and valve 38 downward, to the normal position shown in Fig. 3. Venting produced by opening the conductor's valve, or by action of the deadman valve will cause the piston to move upward.

In the lower position a cavity 41 in valve 38 connects emergency pipe 27 with exhaust port 33 and exposes two ports 42 in the valve seat so that these ports are fed with main reservoir air from chamber 35. Ports 42 lead to the brake pipe feed connection 28, two ports being used to afford large capacity with short valve travel. In the upper position of the valve 38 ports 42 and exhaust port 33 are blanked, and the port leading to emergency pipe 27 is exposed so that main reservoir air is admitted from chamber 35 to pipe 27.

A port 43 and ported shiftable cap 44 are provided and so arranged that shifting of the cap will connect the spaces above and below piston 37, thus rendering the piston inert in its lower position. This is simply a convenient way of cutting out the application valve.

Mounted on the other side of bracket 26 is the housing of the vent valve made up of two sections 45 and 46 between which is clamped a combined gasket and flexible diaphragm 47. This diaphragm separates a quick action chamber 48 from a brake pipe chamber 49. Chamber 49 communicates with brake pipe 17 through a choke 51 and also through a ball check valve 52 opening toward the pipe. Thus air may flow freely from chamber 49 to the brake pipe, but only slowly in the reverse direction.

Clamped through the center of the diaphragm is a stem 53 which clamps two convex disks 54 against opposite faces of the diaphragm. The disks control flexure of the diaphragm and limit its displacement by engagement with stops formed in housing members 45 and 46. A restricted feed port 55 connects quick action chamber 48 and brake pipe chamber 49. A spring 56 urges the diaphragm downward.

The deadman pipe 29 and the conductor's valve pipe 31 both communicate with the space 57 above a rubber check valve 58 which opens upward and is normally held closed by a light spring 59. Valve 58 is in the path of the upper end of stem 53, so that upward movement of the diaphragm unseats valve 58.

The lower end of the stem 53 makes a close sliding fit in guide 61 and is counterbored to provide a valve rim which normally seats on a gasket surrounding an exhaust port 62. When so seated it seals against exhaust, a port 63 leading from the space behind the combined piston and valve 64 which makes a leaky fit in bushing 65. When unseated it vents this port, relieving pressure which normally exists behind this valve.

The combined piston and valve 64 is cup-shaped and carries a rubber seating face which seals on rim 66 surrounding exhaust port 67. The rim 66 is smaller in diameter than piston 64 so that the outer annular area is subject to the pressure in brake pipe 17 arriving by a branch port 68. The space behind piston 64 is charged from the brake pipe by leakage flow around the piston and the pressure so developed and a spring 69 normally hold the valve closed.

If brake pipe pressure is reduced at a service rate, back flow through port 55 prevents the diaphragm from responding. If brake pipe pressure falls at an emergency rate the diaphragm rises sharply opening check valve 58 and vent port 62. This last causes valve 64 to open and vent the brake pipe directly to atmosphere. Piston 37 rises, cuts off the feed to the brake pipe via pipe 28 and admits main reservoir air to pipe 27. Similarly venting through either the conductor's valve or deadman valve causes piston 37 to rise and vents chamber 49 through valve 58 so that the vent valve responds, and causes emergency venting of the brake pipe and interruption of feed of the brake pipe. This causes an emergency application under either automatic or straight air conditions.

In any emergency application produced by or accompanied by venting of the brake pipe, the application valve cuts off feeding flow to the brake pipe. In any emergency not caused or accompanied by venting of the brake pipe such feeding flow is not cut off. A straight air emergency application produced by manipulation of the brake valve is of this latter class.

Turning now to Fig. 4, the deceleration controller will be briefly described. This is designed for single end service and is positioned with reference to the direction of travel of the train as indicated by the arrow and legend "Train travels" in Fig. 4.

The element responsive to deceleration is a heavy mass 71 mounted on ball bearing rollers 72 to move in a right line parallel with the direction of travel of the train. Rearward motion is limited and the normal (inactive) position of the mass is defined by a stop 73. At its forward end the mass reacts against the upper end of a lever 74 fulcrumed at 75, the lever transmitting thrust delivered by the mass to the forward end of a valve 76 which is of the inside cut-off balanced piston type, and performs both admission and exhaust functions.

The valve 76 is slidable in a bushing or seat 77 having at its forward end inlet ports 78, at its rear end exhaust ports 79 (which lead to atmosphere through the lightly loaded check valve muffler 81). Between the admission and exhaust ports are the control reservoir ports 82. The reduced middle portion of valve 76 always registers with ports 82 and the valve has a slight lap with respect to the admission and exhaust ports so that they are connected selectively with port 82. In the normal position shown the valve connects supply ports 78 with control reservoir ports 82. As mass 71 moves forward under the effects of inertia during brake applications the valve progressively closes ports 78 and on slight motion after complete closure thereof starts to expose progressively the exhaust ports 79, which then communicate with the control reservoir ports 82.

Graduated yielding resistance to displacement of the mass and valve is afforded by a coil compression spring 83 reacting against the end of valve 76 and sustained by a shiftable spring seat 84. In the running position, shown in Fig. 4, the stress is low, establishing a low deceleration for service stops. In certain types of emergency stops the stress in the spring 83 is increased to establish a high deceleration rate by admitting compressed air to cylinder 85 behind piston 86 whose slotted rod 87 engages seat 84. Throughout all but the terminal portion of service stops a suitable deceleration rate is established by moderately increasing the stress in spring 83. This is done by admitting compressed air to cylinder 88 behind piston 89 which reacts on one end of lever 91 whose other end enters the slot in rod 87 and engages spring seat 84.

All three deceleration rates may be changed by manual adjustments. Stop 92 determines the normal position of seat 84 and hence the terminal rate in service. Stop 93 limits the higher rate used in service. Adjustable thrust screw 94 in piston 86 determines the rate established in emergency stops by this piston.

The bypass check valve 95 is lightly loaded by spring 96 and permits flow from the control chamber ports 82 to the inlet ports 78. The purpose is to permit release of the brakes by the engineer's brake valve, even at times when the deceleration controlling valve 76 laps ports 78.

There are certain other mechanisms in Fig. 5, the description of which had best be reserved until certain other major components have been described.

The control reservoir ports 82 are connected by the control reservoir pipe 97 with the control reservoir 98, which in turn is connected by a pipe 99 with the master relay bracket 101. The parts 98 to 101 are shown on Fig. 5, to which reference will now be made.

The control reservoir 98 is a fixed volume chamber in which the engineer's brake valve establishes regulatory pressures. Such pressures when established in sufficient intensity to affect the deceleration controller of Fig. 4, are modified (ordinarily reduced) by the operation of the deceleration controller. The purpose of using a fixed volume, such as the control reservoir 98, is to permit the engineer's brake valve and the deceleration controller to function uniformly irrespective of the number of cars in the train. This result is secured because the pressure established in the control reservoir 98 acts through a relay mechanism to establish a corresponding pressure in the straight air pipe 18. This pressure in the straight air pipe determines the pressure in the brake cylinders through the operation of car relay valve mechanisms fully described in the pamphlet above mentioned, but not illustrated in the drawings of the present application since they conform to existing standard practice, and are not features of the present invention.

The relay mechanism is of a dual character. There is a pneumatic relay and an electric relay switch. Of the two the relay switch is the more sensitive device and responds to changes of pressure in the control reservoir 98 to close application circuits and release circuits selectively, such circuits including magnet valves which admit pressure fluid to and exhaust it from the straight air pipe at intervals throughout the length of the train, the magnet valve units being preferably located one on each car in the train.

The pneumatic relay device under normal or running conditions opens an exhaust from the straight air pipe. In response to rising pressure in the control reservoir 98 it closes this exhaust passage but does not itself open an admission passage from the main reservoir pipe 16 to the straight air pipe unless the pressure differential between the control reservoir and the straight air pipe substantially exceeds that necessary to operate the relay switch. In other words the pneumatic relay assists final release, but so far as application is concerned it is merely a stand-by device which will operate to admit air from the main reservoir pipe to the straight air pipe unless the pneumatic switch promptly performs that function. It is important to establish this differential effect between the operation of the two relay devices because response of the pneumatic relay would disturb the response of the electric switch and thus establish a vicious cycle highly detrimental to smooth operation.

The control reservoir pipe 99 communicates by passage 102 with the space below the pneumatic relay piston 103. A branch of the straight air pipe 18 communicates by way of port 104 with the space above the relay piston 103. The piston 103 has a stem 105 which is guided in portions of the housing 106 of the pneumatic relay valve. Pivoted on this stem 105 is a lever 107, one end of which engages a threaded adjustable stop 108 and the other end of which engages a spring stop 109. The two ends 107 and 110 of the lever engage respectively an exhaust valve plunger 111 and an inlet valve plunger 112. Connected to the plunger 111 is a normally open poppet valve 113 which controls exhaust from the space above the piston 103 to an exhaust passage 114 leading to atmosphere. The construction of the exhaust valve is fully shown in the drawings but is not a feature of the invention and need not be described in detail.

The inlet valve plunger 112 is in thrust relation with a small pilot valve 115 mounted in the main inlet valve 116, both of the poppet type and guided as clearly shown in the drawings. Valve 115 is held seated by a relatively light spring 117 and the valve 116 is held seated by a relatively heavier spring 118. The plunger 112, after it has unseated the pilot valve 115, will engage and unseat the main inlet valve 116. These valves control a supply of main reservoir air from the main reservoir pipe 16 through the branch 23 and the passage 119. As the piston 103 moves up the effect is first to close the exhaust valve 113, whose closing movement is not subject to spring resistance. After this valve has been closed further upward motion of the piston 103 is resisted by the spring 117, and this resistance is sufficient to prevent further rise of the piston 103 unless the pressure differential on this piston exceeds that normally encountered when the electric switch mechanism is operative. However, if the plunger 112 moves far enough to unseat the valve 115 the effect is to unload the larger valve 116 and cause that to open relatively freely.

The port 121 communicates with the space above piston 103 and consequently is subject to straight air pipe pressure. Two reversely seated check valves 122 and 123 are interposed between the port 121 and the control reservoir port 102. They are loaded by means of springs 124 and 125 sufficiently heavily to maintain the valves closed so long as the pneumatic master relay functions. However, if the pneumatic relay and the electric switching mechanism are both ineffective these by-pass valves will open selectively to permit flow in reverse directions between the straight air pipe 18 and the control reservoir 98. Consequently complete failure of the master relay mechanism can not defeat application and release of the brakes.

The electric relay switch is also mounted on the bracket 101 in a casing indicated generally by the numeral 126 though it is constructed in sections as indicated in the drawings. Clamped between two of the sections is a flexible diaphragm 127, preferably of rubber, and clamped through the center of the diaphragm is an actuating hub 128 with associated convex disks which control the flexure of the diaphragm and limit its displacement by collision with portions of the housing.

The space above the diaphragm is subject to straight air pipe pressure arriving through a branch of the port 104 and the space below the diaphragm is subject to control reservoir pressure arriving through a branch of the port 102. Upward motion of the diaphragm causes the hub 128 to strike a plunger 129 and close a contactor 131 against a fixed contact 132. This establishes a circuit from a connection 133 leading from a source of electric current to the application wire 19. The return wire 22 is connected to the other pole of the current source and the application magnets (not shown) are interposed between the application wire 19 and the return wire 22. Similarly downward motion of the diaphragm causes the hub 128 to strike a stem 134 which forces a contactor 135 into contact with a fixed contact 136. The contactor 135 is connected with the terminal 133 and the fixed contact 136 is connected with the release wire. The release magnet units are interposed between the release wire and the common return wire, which, as above stated, is connected to the other terminal of the current source. It follows that upward motion of the diaphragm 127 energizes the application magnets and downward movement energizes the release magnets. In this way pressure in the straight air pipe is controlled by the electric relay switch and as explained, when the electric mechanisms function properly the pneumatic relay is ineffective except to close the exhaust which normally exists from the straight air pipe.

The engineer's brake valve is mounted on a pipe bracket 137 to which all pipe connections are made, and before discussing the details of the brake valve these connections will be described.

Pipe 27 leads to one end of a double check valve 138, of familiar form. The other end of the double check valve is connected by pipe 139 with a port in pipe bracket 137. Pipe 141 leads from the side of the double check valve to the admission port 78 of the deceleration controller. Consequently if pressure is established either in the pipe 27 or in the pipe 139 the double check valve functions to connect the pipe in which pressure is developed with the pipe 141. A branch 142 of the pipe 27 leads directly to the cylinder 85 of the emergency loading mechanism of the deceleration controller. As indicated by the legend it may also lead to a control mechanism for the engine throttle, the purpose being to set the propelling engine of the train to idling position if an emergency application of the brakes is made through the operation of the application and vent valve shown in Fig. 3. The pipe 28 leads to a port in the pipe bracket 137. Pipe 29 leads from the pipe bracket 26 of the application and vent valve (Fig. 3) to the deadman foot valve 143. This is merely a normally open stop valve which may be held closed by depressing the pedal 144. The purpose of this valve is to permit the engineer to release the deadman handle of the engineer's brake valve, hereinafter described, without producing an emergency application of the brakes.

An automatic emergency application will be produced through the operation of the application and vent valve (Fig. 3) unless the engineer maintains either the pedal 144 or the brake valve handle depressed at all times. The pipe 145 leads from the valve 143 to the pipe bracket 137 of the engineer's brake valve and the deadman foot valve merely controls communication between the pipes 29 and 145. It has no pressure venting function. The engineer's brake valve includes an equalizing discharge mechanism and the equalizing reservoir is indicated at 146 (Fig. 3) and is connected by pipe 147 with the pipe bracket 137 of the engineer's brake valve. The brake pipe 17 is connected by a branch 148 with the pipe bracket 137. A pipe 149 connects the port in the bracket 137 with one end of a double check valve 151. The side connection 152 from the double check valve 151 leads to the cylinder 88 of the service mechanism of the deceleration controller. The other end of the check valve 151 is connected by pipe 153 with the side port of the pilot valve whose body is indicated at 154. The lower end of the body 154 is connected to a branch of the control reservoir pipe 87.

Mounted in the body 154 is a cylinder bushing 155 having an annular valve seat 156, to the interior of which control reservoir pressure is admitted through the branch just mentioned.

Ports 157 connect the space outside the seat 156 with the pipe 153. A cup-shaped valve 158 is loosely fitted in the bushing 155 so that slight leakage between the valve and the bushing is permitted. The valve is urged toward seat 156 by coil compression spring 159, and the space above the valve is vented to atmosphere at 161. Means are provided as shown to adjust the stress on the spring 159. If pressure be admitted to the pipe 149 the double check valve 151 will connect this pipe with the pipe 152 and this connection is made in service application position under straight air conditions so that the decelorometer is immediately loaded for the normal service deceleration rate. The pipe 149, however, is vented to atmosphere in lap position, as will be later explained. By this time, however, rising pressure in the control reservoir 98 will start to overpower spring 159. As soon as the valve 158 starts to move upward its whole area will be subject to control reservoir pressure, but it will move full stroke, seating at its upper end on gasket 162, such seating preventing leakage after the valve has moved to its upward position. The effect of this is to connect control pipe 97 with pipe 153 and if pipe 149 is vented the double check valve shifts to connect pipe 153 with pipe 152. Thereafter the piston 89 is subject to control reservoir pressure.

The operation of the deceleration controller is to reduce the pressure in the control reservoir 98 as the train slows down. As the train approaches a state of rest and before it actually stops, the pressure in the control reservoir 98 will fall so low that the spring 158 will again shift the valve 158 to its lower position. This results in venting the cylinder 88 through the leakage passage between the valve element 158 and the bushing 155. Consequently the piston 89 retreats and just before a stop is reached the deceleration controller is conditioned to maintain a relatively low deceleration rate which is favorable to a smooth stop.

The general characteristics of the brake system having been described in detail, the construction and operation of the convertible engineer's brake valve can now be explained.

Formed on the upper face of pipe bracket 137 is a ported seat for a rotary changeover valve 165, which has two positions, a "straight air" position shown in Fig. 1 and an "automatic" position shown in Fig. 2. The function of the rotary valve is to change the connections of ports in the seat of the rotary valve of the engineer's brake valve, according to the type of brake system to be operated. In consonance with such change the valve 165 cuts in and out two valve mechanisms used with an automatic system and not with a straight air system. These are an equalizing discharge valve, and a cam operated poppet valve for venting the brake pipe in emergency position of the engineer's brake valve.

A significant aspect of the invention is that, for automatic systems the brake pipe is vented in emergency through this valve distinct from the rotary valve, and not through the rotary valve as is customary. This greatly simplifies the porting of the rotary valve and its seat and is an important contributing factor to the success of the invention.

Valve 165 is enclosed in a cap 166 to which main reservoir air is supplied from pipe 16 by way of branch 24 and passage 167, so that the valve is held closely to its seat.

The valve 165 is turned by a key 168 swiveled in cap 166 and having a suitable packing gasket, as shown. Key 168 carries a head with spaced lugs 169 between which the brake valve handle may be temporarily inserted to shift the valve. A guard cap 171 permits the handle to be inserted and withdrawn in two positions only, and to shift between these two positions which are those shown in Figs. 1 and 2 respectively. Since the brake valve handle must be used to shift the changeover valve, the brake valve can be manipulated only after the changeover valve has been set in one of its two characteristic positions.

Mounted on the upper face of bracket 137 is the seat member 172 for the rotary valve 173 of the engineer's brake valve. The rotary valve 173 is mounted in a cavity 174 in bracket 137 and turns on an inverted seat formed on the lower face of member 172, as clearly shown in Fig. 1. Mounted on member 172 is the cap 175 closed at its top by a small cap 176 which affords access to a deadman valve, to be described.

The rotary valve 173 is turned by a key 177 swiveled in member 172 and squared at its upper end to afford a driving connection between it and a sleeve 178 swiveled in cap 175. Sleeve 178 has a notched flange 179 which coacts with a spring urged impositive detent 181 to define the four positions, release, lap, service and emergency in a manner familiar to those skilled in the art.

Sleeve 178 has a cam groove 182, so formed that in emergency position (and not in the three other positions) stem 183 is pressed radially outward to unseat the normally closed poppet type brake pipe vent valve 184. This valve is effective in automatic setting, but disconnected from the system in straight air setting. In emergency position of the brake valve under automatic setting this valve vents the brake pipe. The valve is urged to its seat by a spring, as shown.

Freely swiveled in the upper end of sleeve 178, and urged upward by coiled compression spring 185 which seats on disk 186, is a member 187 with spaced lugs 188, between which the handle 189 is inserted through a slot 191 in cap 175, and a second slot in the guard bell 192 carried by lugs 188. A slot in bushing 190 limits insertion and removal of the handle 189 to a single position (preferably service position). When the handle 189 is inserted its nose 193 enters between lugs 194 on sleeve 178 and beneath roller 195 mounted between these lugs, thus connecting the handle 189 and member 187 with sleeve 178. The roller serves as a fulcrum for the handle 189 which must be held down by the operator against the urge of spring 185.

If the handle 189 is released, spring 185 forces it upward, causing it to lift plunger 196 and shift deadman valve 197 from the exhaust seat 198 which it normally closes, to the supply seat 199 which is normally open. Valve 197 is biased by a light spring as shown. Cross pin 201 and pin 202 serve in part to limit the form of handle which may be inserted.

The parts 185 to 202 inclusive conform generally to the construction described and claimed in my Patent No. 2,025,154 granted December 24, 1935, to which reference may be made for a more complete description of details.

The handle 189 carries a pinch handle 203 which may be actuated in any position of handle 189 to depress yoke 204 (pivoted on trunnions not shown in the drawings). Depression of yoke 204 forces plunger 205 downward and unseats the sander valve 206, which is of the poppet type and is spring urged, to its seat.

Mounted in a cavity in the lower side of the bracket 137 is the equalizing discharge valve. A single spider structure (see Fig. 1) forms a closure cap 207 and cylinder bushing 208 each sealed by gaskets clearly shown in the drawings. A member 209 serves as a valve seat and guide for the stem 211 of the equalizing piston 212. In automatic setting the space above piston 212 is connected with equalizing reservoir 146 and the space below with brake pipe 17. When piston 212 lifts, brake pipe is vented to atmosphere through member 209 at a rate controlled by the size of port in control plug 213. In straight air setting the spaces above and below piston 212 are connected to atmosphere.

The mechanical structure having been described, the porting can now be traced. The porting of valve 165 and its seat are indicated diagrammatically in Figs. 1 and 2. Various actual portings are possible, all conforming to the diagrams, and none involving more than mechanical skill to lay out. Hence the diagrams are deemed sufficient to disclose the principle.

Porting of the rotary valve 173 and its seat, are however, matters of the utmost importance from the standpoint of invention. Hence actual porting is shown in Figs. 9, 10, 11 and 12, producing the connections diagrammatically shown in Figs. 1, 6, 7 and 8 respectively.

Referring first to the seat of the changeover valve, it will be observed that five of the six pipes connected to the bracket 137 beneath the changeover valve terminate in ports on the seat of the changeover valve. To avoid confusing the drawings these ports will be indicated by the reference numerals applied to the pipes, the ports being merely extensions of these pipes. Thus the equalizing reservoir pipe 147 leads to a port terminating on the seat as does 139 which is the control reservoir pipe. Pipe 139 does not communicate directly with the control reservoir but does communicate through the double check valve 138 and through the graduating valve of the deceleration controller. The pipe 149 leading to the deceleration rate controller and the branch 148 of the brake pipe 17 both have ports terminating in the seat of the changeover valve as does the main reservoir connection 28, which, as previously explained, is not directly connected with the main reservoir but is connected with the main reservoir through the application valve shown in Fig. 3. The branch 24 of the main reservoir pipe does not lead to the valve seat of the changeover valve but merely communicates with the space above this valve. There is also an exhaust port 215 in the seat of the changeover valve.

The remaining ports in the seat of the changeover valve can best be described by starting at the seat of the rotary valve 173, and this will now be done.

Taking up the ports in order from left to right as they appear in Figs. 1, 6, 7 and 8, and describing the functions and the interchange connections of each, the port 216, whose actual form is indicated in Figs. 6 and 9 to 12, serves as an atmospheric exhaust port in straight air setting, and serves as the brake pipe port in automatic setting. It is connected by a passage 217 with the emergency brake pipe vent valve 184, with the space below the equalizing piston 211, and with a port 218 in the seat of the changeover valve. In straight air position the port 218 is connected by a cavity 219 with atmospheric exhaust port 215. At the same time another cavity 221 connects brake pipe port 148 with the main reservoir port 28, thus establishing a charging connection for the brake pipe. In automatic setting a cavity 222 connects the port 218 with the brake pipe port 148, thus establishing a direct connection from the brake pipe to the brake pipe port in the seat of the rotary valve.

The port 223, whose form and location are clearly shown in Figs. 9 to 12, serves in straight air setting as the control reservoir port, being connected to the control reservoir through the double check valve 138 and the deceleration controller. In automatic setting it is the port through which main reservoir air is supplied to the brake pipe in release under control of the application valve shown in Fig. 3. Consequently, the port 223 is connected by a passage 224 with a port in the seat of the changeover valve, which in straight air setting is connected by cavity 225 with the port 139, while in automatic setting the port 224 is connected by a passage 226 with the main reservoir pipe 28. Under these conditions the control pipe 139 is connected through a restricted passage with cavity 227 in the changeover valve, such cavity then communicating directly with the exhaust port 215. It follows that in automatic setting the control reservoir is vented.

The port 228 is functionless in straight air setting and is the equalizing reservoir port in automatic setting. Accordingly this port leads to the space above the equalizing piston 212 to a gage connection indicated by a legend and to a port 229 in the seat of the changeover valve. This port is blanked by the changeover valve in straight air setting and in automatic setting is connected by a cavity 231 with the equalizing reservoir port 147. It may be remarked that at this point both the ports 147 and 229 are blanked by the changeover valve in straight air setting. This traps the charge in the equalizing reservoir, but as will become apparent from a consideration of Figs. 1, 6, 7 and 8, under straight air setting the port 229 is vented to atmosphere through one or another exhaust passage afforded by the rotary valve in the various functional positions thereof. Thus the venting of the space above and below the valve 212 and the passage leading to the emergency vent valve 184 renders these mechanisms functionless in straight air position. It should be observed further that as shown in Figs. 9 to 12 two ports 228 are indicated. These ports are connected together and are functionally a single port, one port functioning in one position and another in another position. It is simply a convenient way to secure the desired timing.

Port 232 is a port which serves in a straight air setting to energize the loading motor. That is to say, it is connected to the pipe 149. In automatic setting the loading motor is functionless and this port is blanked and the pipe 149 is vented to atmosphere. To effect this result the port 232 is connected by a passage 233 with a port 234 in the seat of the changeover valve. In straight air setting a passage 235 in the changeover valve connects port 234 with port 149. In automatic setting port 234 is blanked by the changeover valve and port 149 communicates with passage 227, which at that time communicates with the atmospheric exhaust port 215.

Port 236 is the atmospheric exhaust port effective in straight air setting and blanked in automatic setting. To this end port 236 is connected by a passage 237 with the port in the seat of the changeover valve which in straight air setting is connected by the cavity 219 with the exhaust port 215.

Port 238 is functionless in straight air setting and in automatic setting is a preliminary exhaust port through which air is vented from the equalizing reservoir to cause the equalizing discharge valve to function and produce a service reduction of brake pipe pressure. Accordingly port 238 is connected by passage 239 and choke 241 with a port in the seat of the changeover valve which is blanked in straight air setting and which in automatic setting is connected by the cavity 227 with the atmospheric exhaust port 215. This port communicates with port 228 in service position and is blanked in emergency position. There is a large through port 243 which registers with port 223 in emergency position. There are two cavities 244 and 245 connected by a passage 246 within the body of the rotary valve. The ports 244 and 245 have short extensions, clearly shown in the drawings, but not identified by reference numerals as this would cause confusion. In release position these connected ports afford communication between ports 223 and 216 and one of the ports 228. In lap position these ports will connect the ports 228, 232 and 236, the ports 223 and 216 being then blanked by the rotary valve. In service position the ports 244 and 245 connect one of the ports 228 with the ports 236 and 238. In emergency position the port 244 connects one of the ports 228 with the port 216. In the face of the rotary valve 173 there is a cavity 247 which is functionless except in service position at which time it connects ports 223 and 232.

Function of the Rotary Valve

Release position

*Straight air setting.*—Control reservoir port 223 is connected to exhaust port 216. Exhaust port 236 is blanked. Changeover valve 232 is connected to exhaust port 216 by passage 246. This causes release of the brakes because the control reservoir is vented to atmosphere.

*Automatic setting.*—Main reservoir port 223 is connected wtih brake pipe port 216 and with one of the equalizing reservoir ports 228, thus charging the brake pipe and equalizing reservoir and releasing the brakes. Preliminary exhaust port 238 is blanked.

Service position

*Straight air setting.*—Main reservoir air passes by way of port 242 to control reservoir port 223 and to changeover port 232. The effect is to build up control reservoir pressure at a moderate rate and to develop control reservoir pressue in cylinder 88 by flow through pipe 149 and past check valve 151. If the deceleration rate builds up to a value at which the deceleration controller takes effect it will stop flow to the control reservoir from the engineer's brake valve and thereafter reduce contol reservoir pressure to maintain the desired deceleration rate.

*Automatic setting.*—Port 223 is now connected to the main reservoir so that registration of port 242 therewith is functionless. Cavities 244 and 245 connect the equalizing reservoir port 228 with the preliminary exhaust port 238 which is now effective. The exhaust port 236 is ineffective. Accordingly equalizing reservoir pressure is reduced in the manner characteristic of the usual equalizing discharge valve. When a desired reduction has been secured the valve is moved to lap position. Port 232 is blanked and ineffective.

Lap position

*Straight air setting.*—The control reservoir port 223 and the exhaust port 216 are both blanked and the changeover port 232 is connected to exhaust port 236 which is open. Consequently pipe 149 is vented. As an incident to the application which has already started the pressure in control reservoir 98 has caused the valve 158 to shift to its upper seat. Consequently the venting of pipe 149 assures shifting of the double check valve 151 to its forward seat. This connects the control reservoir with the cylinder 88. When control reservoir pressure falls below a critical value, as it will when the train approaches a stop, valve 158 shifts to its lower seat, vents cylinder 88 to atmosphere and the deceleration controller is set for a lower deceleration rate, thus causing a smooth stop.

*Automatic setting.*—Main reservoir port 223 and brake pipe port 216 are blanked. Exhaust port 236, though exposed by the rotary valve, is blanked by the changeover valve. Preliminary discharge port 238 is blanked. Consequently the pressure in the equalizing reservoir is trapped. Port 232 is blanked by the changeover valve.

Emergency

*Straight air setting.*—The large port 243 registers with the control reservoir port 223 so that control reservoir pressure is built up almost instantly. At the same time main reservoir air is admitted by port 242 to the changeover port 232 and since the valve remains in emergency position throughout the emergency stop, main reservoir air is immediately admitted to the cylinder 88, holding the higher deceleration rate to the termination of the stop. The other ports in the rotary valve are functionless. The emergency brake pipe vent valve 184 is opened but remains functionless. If the engineer wants a still heavier deceleration rate he can secure it by allowing the deadman device to function, as hereinafter described. This can be done, for example, by allowing the handle 189 to rise in which case the vent valve mechanism, shown in Fig. 3, functions and main reservoir air is admitted to pipe 27 and passes by way of 142 to the cylinder 85, establishing the highest deceleration rate of which the deceleration controller is capable.

*Automatic setting.*—Such a registration of port 243 with 223 is without effect because 223 is now main reservoir port. Equalizing reservoir port 228 is connected with brake pipe port 216 by the cavity 244 and the brake pipe is vented to atmosphere by the vent valve 184. The effect is to vent the brake pipe immediately and cause an emergency application of the brakes.

The emergency application so produced throughout the train is of the automatic type, but on the locomotive the straight air apparatus is also effective for the reason that venting of the brake pipe causes the application and vent valve of Fig. 1 to function.

Briefly described venting of the brake pipe causes diaphragm 47 to rise and vent valve 64 to open. Opening of valve 58 causes piston 37 to rise. Main reservoir air enters pipe 27 and shifts check valve 13, terminating the venting of control reservoir 98 through pipe 139 and ports 227 and 215, and supplies main reservoir air to pipes 141 and 142 charging the control reservoir 98 through the deceleration controller and shifting piston 86 to establish the highest available deceleration rate.

Thus on the locomotive in emergency applications in automatic setting of the changeover valve 165, a straight air deceleration controlled emergency application is superimposed on an automatic emergency application.

Deadman mechanism

It remains to describe the deadman mechanism associated with the handle 189.

Branch 24 of the main reservoir pipe supplies air through passage 167 to the seat 199 of the deadman valve which is normally opened so that air so supplied flows through passage 251 to the pipe 145 and then through the diaphragm foot valve 143, whose construction is clearly shown in Fig. 1. This valve is of known form. It has an opening tendency and may be held closed by depressing the pedal 144. The valve controls communication between the pipes 145 and 29 heretofore described. If the valve 143 be held closed the handle 189 may be released without causing an application, but if the handle 189 be released while valve 143 is open, the deadman valve 197 will be raised, cutting off the supply to the port 251 and venting the port 51 to atmosphere through the seat 198.

The effect of this is to vent chamber 36 and chamber 49, so that both the application valve and the vent valve (Fig. 3) function. The admission of air to pipe 27 produces an emergency straight air application on the locomotive whether the changeover valve be set for straight air or automatic functions. If set for straight air this will be effective throughout the train. If set for automatic there will be an automatic emergency application throughout the train and also on the locomotive.

The annular and radial grooves 254 (see Fig. 13) are for the distribution of lubricant and have no port functions. This feature of lubrication is of general applicability and hence not a part of the present invention, consequently no claim is here made to that feature.

The operation of the brake system is well understood and is more elaborately discussed in other patent applications to which reference has been made. Consequently it is deemed unnecessary to describe this in detail. The operative characteristics of the convertible engineer's brake valve and its general relationship to the system have been discussed in considerable detail, and it is deemed unecessary to elaborate further upon this.

The important characteristics of the invention are that a single brake valve may be set to operate as a straight air valve or as an automatic brake valve of the equalizing discharge type. That the valve has four functional positions which are identical when set for straight air operation and when set for automatic operation. Further that the manipulation of the brake valve for either type of operation is essentially the same, due allowance being made for slight differences in timing which might be introduced by the proportions of the device, but which can be largely eliminated by a proper relative proportioning of the equalizing reservoir, control reservoir and the ports which control flow affecting the pressures in these reservoirs. It is highly desirable that a close approximation to uniform operative characteristics be had irrespective of the change over from one system to the other, and the invention permits the attainment of these results, or at least their close approximation.

The feature of operating the changeover valve by means of the handle of the automatic valve is highly important because the engineer's brake valve cannot be manipulated unless the changeover valve be in one or the other of its two functionally significant positions. A contributing factor to success is the idea of permitting the withdrawal of the brake valve handle from the engineer's brake valve only in a brake applying position. From this it follows that the changeover valve will be manipulated only when the train is in a safe condition.

While the invention has been rather elaborately described in connection with the H. S. C. schedule of high speed brakes, and while that is the field of use for which it is designed and in which it is expected to have its largest commercial use, the invention is applicable to control of other straight air systems including or omitting the electrical relay scheme, including or omitting the deceleration control scheme, or making use of application and vent valves specifically different from that shown in Fig. 3.

In applying the brake valve to such varied fields of use certain modifications or omissions within the range of mechanical skill are contemplated, and for that reason the description here given is to be taken as illustrative and not limiting.

What is claimed is,—

1. In a pneumatic brake system, the combination of a normally charged brake pipe; a normally vented straight air pipe; an air supply; an engineer's brake valve connected to said pipes and supply; and changeover means associated with said brake valve and adjustable at will selectively to two settings, in one of which it establishes a charging path to the brake pipe and establishes connections to certain ports in the engineer's brake valve whereby it conditions the engineer's brake valve to control the brakes by varying the pressure in the straight air pipe, and in the other of which it establishes different connections to the same ports in the engineer's brake valve whereby it conditions the engineer's brake valve to control the brakes by varying the pressure in the brake pipe.

2. In a pneumatic brake system, the combination of a normally charged brake pipe; a normally vented straight air pipe; an air supply; an engineer's brake valve connected to said pipes and supply; and changeover means associated with said brake valve and adjustable at will selectively to two settings, in one of which it establishes a charging path to the brake pipe and conditions the engineer's brake valve to control the brakes by varying the pressure in the straight air pipe, and in the other of which it conditions the engineer's brake valve to control the brakes by varying the pressure in the brake pipe, said brake valve having a single set of operating positions effective in both settings of the change-over mechanism.

3. In a pneumatic brake system, the combination of a normally charged brake pipe; a normally vented straight air pipe; an air supply; an engineer's brake valve connected to said pipes and supply; and changeover means associated with said brake valve and adjustable at will selectively to two settings, one of which is a straight air setting in which the changeover valve maintains the brake pipe charge and establishes connections to certain ports in the brake valve whereby it conditions the brake valve to control the brakes by varying the pressure in the straight air pipe, and the other of which is an automatic setting in which the changeover valve vents the straight air pipe and establishes different connections to the same ports in the brake valve whereby it conditions the brake valve to control the brakes by varying the pressure in the brake pipe.

4. In a pneumatic brake system, the combination of a normally charged brake pipe; a normally vented straight air pipe; an air supply; an engineer's brake valve connected to said pipes and supply; and changeover means adjustable at will selectively to two settings, one of which is a straight air setting in which the changeover valve maintains the brake pipe charge and conditions the brake valve to control the brakes by varying the pressure in the straight air pipe, and the other of which is an automatic setting in which the changeover valve vents the straight air pipe and conditions the brake valve to control the brakes by varying the pressure in the brake pipe, said brake valve having a single set of operating positions effective in both settings of the changeover mechanism.

5. In a pneumatic brake system, the combination of an air supply; an engineer's brake valve; a normally charged equalizing chamber and associated equalizing discharge valve for producing an application according to automatic brake characteristics in response to reduction of equalizing reservoir pressure; a normally vented control reservoir and associated relay mechanism for producing an application according to straight air characteristics in response to development of control reservoir pressure; and means for converting said engineer's brake valve from automatic to straight air characteristics comprising means for connecting said valve selectively in controlling relation with said reservoirs.

6. In a pneumatic brake system, the combination of an air supply; an engineer's brake valve; a normally charged equalizing reservoir and associated equalizing discharge valve for producing an application according to automatic brake characteristics in response to reduction of equalizing reservoir pressure; a normally vented control reservoir and associated relay mechanism for producing an application according to straight air characteristics in response to development of control reservoir pressure; and means for converting said engineer's brake valve from automatic to straight air characteristics comprising means for connecting said valve selectively in controlling relation with said reservoirs, the porting of the brake valve being so related to the volumes of the two reservoirs that the time characteristics for manipulation to produce a given braking effect are substantially the same in both straight air and automatic settings.

7. An engineer's brake valve comprising in combination, a manually operable valve; an equalizing discharge valve mechanism adapted to be controlled thereby; means affording connections for the manually operable valve for brake pipe, straight air pipe, air supply and exhaust; and a changeover valve controlling said connections and having two positions, in one of which the manually operable valve exercises straight air control through the straight air pipe connection, and the equalizing discharge valve is disconnected, and in the other of which the manually operable valve exercises automatic control through the brake pipe connection and the equalizing discharge valve is operatively connected.

8. An engineer's brake valve comprising in combination, a manually operable valve, having release, lap, service, and emergency positions; an emergency brake pipe vent valve arranged to be opened in said emergency position; an equalizing discharge valve mechanism adapted to be controlled by the manually operable valve; means affording connections for brake pipe, straight air pipe, air supply and exhaust; and a changeover valve controlling said connections and having two positions, in one of which the manually operable valve exercises straight air control through the straight air pipe connection and the emergency brake pipe vent valve and equalizing discharge valve mechanism are rendered functionless, and in the other of which the manually operable valve exercises automatic control through the brake pipe connection and the emergency brake pipe vent valve and equalizing discharge valve mechanism are conditioned to function.

9. An engineer's brake valve, comprising a ported seat and a manually operable valve coacting therewith, the seat having two convertible ports, one adapted to serve as an exhaust port in straight air operation and as a brake pipe port in automatic operation, and the other adapted to serve as a straight air pipe port in straight air operation and as a main reservoir port in automatic operation, the seat having other ports adapted to serve as equalizing reservoir port and preliminary exhaust port; an equalizing discharge valve mechanism adapted to be controlled by the last-named ports; and changeover means for converting the connections of said convertible ports for straight air and automatic operations, said changeover means when set for straight air operation rendering the preliminary exhaust port and equalizing reservoir port functionless.

10. An engineer's brake valve comprising a ported seat and a manually operable valve coacting therewith, the seat having two convertible ports, one adapted to serve as an exhaust port in straight air operation and as a brake pipe port in automatic operation and the other adapted to serve as a straight air pipe port in straight air operation and as a main reservoir port in automatic operation, the seat having other ports adapted to serve as equalizing reservoir port and preliminary exhaust port; an equalizing discharge mechanism adapted to be controlled by the last-named ports; an emergency brake pipe vent valve arranged to be actuated in timed relation with said manually operable valve; and a changeover means for converting the connections of said convertible ports for straight air and automatic operations, said changeover means when set for straight air operation rendering the preliminary exhaust port and the equalizing reservoir port functionless.

11. An engineer's brake valve comprising a ported seat and a manually operable valve coacting therewith, the seat having two convertible ports, one adapted to serve as an exhaust port in straight air operation and as a brake pipe port in automatic operation and the other adapted to serve as a straight air pipe port in straight air operation and as a main reservoir port in automatic operation, the seat having other ports adapted to serve as equalizing reservoir port and preliminary exhaust port; an equalizing discharge mechanism adapted to be controlled by the last-named ports; an emergency brake pipe vent valve arranged to be actuated in timed relation with said manually operable valve; and a changeover means for converting the connections of said convertible ports for straight air and automatic operations, said changeover means when set for straight air operation rendering the preliminary exhaust port, the equalizing reservoir port and the emergency brake pipe vent valve functionless.

12. The combination of an engineer's brake valve convertible to control straight air brakes and automatic brakes; means for converting said brake valve; and a single actuator capable of entering into actuating relation with said brake valve and said converting means selectively.

13. The combination of an engineer's brake valve convertible to control straight air brakes and automatic brakes; means for converting said brake valve; and a single actuator capable of entering into actuating relation with said brake valve and said converting means selectively, said actuator being movable into and out of actuating relation with the brake valve only in an application position thereof.

14. The combination of an engineer's brake valve convertible to control straight air brakes and automatic brakes; means for converting said brake valve; and a single actuator capable of entering into actuating relation with said brake valve and said converting means selectively, said actuator being movable into and out of actuating relation with the brake valve only in an application position thereof, and into and out of actuating relation with the converting means only in the straight air and automatic settings thereof.

15. A pneumatic brake system comprising an air supply; a normally charged brake pipe; a normally vented straight air pipe; means responsive to the rate of deceleration produced by a brake application and associated with the straight air pipe to modulate pressure established therein; motor operated means for adjusting the last-named means; an engineer's brake valve connected with said pipes and supply; and a changeover device having two settings, in one of which the brake valve regulates the pressure in the brake pipe and said motor operated adjusting means is functionally disconnected from the brake valve, and in the other of which the brake valve regulates the pressure in the straight air pipe and the motor operated adjusting means is subject to control at least in part by the brake valve.

16. The combination of an air supply; a normally charged brake pipe; a normally vented straight air pipe; an engineer's brake valve connected with said pipes and supply and including a main valve having release, lap, service and emergency positions, and a separate brake pipe vent valve and means for so actuating said valves in timed relation that the vent valve is open in emergency position of the main valve; and a changeover device associated with the brake valve and having two settings, in one of which it renders said vent valve effective and conditions the main valve to perform release, lap and service functions by controlling pressure in the brake pipe and vents the straight air pipe, and in the other of which setting it charges the brake pipe, conditions the main valve to perform release, lap, service and emergency functions and renders the emergency vent valve ineffective.

17. The combination of an air supply; a normally charged brake pipe; a normally vented straight air pipe; an engineer's brake valve connected with said pipes and supply and including a main valve having release, lap, service and emergency positions, and a separate brake pipe vent valve and means for so actuating said valves in timed relation that the vent valve is open in emergency position of the main valve; and a changeover device associated with the brake valve and having two settings, in one of which it renders said vent valve effective and conditions the main valve to perform release, lap and service functions by controlling pressure in the brake pipe, and in the other of which settings it conditions the main valve to perform release, lap, service and emergency functions and renders the emergency vent valve ineffective.

18. The combination of an air supply; a normally charged brake pipe; a normally vented straight air pipe; and engineer's brake valve connected with said pipes and supply and including a main valve having release, lap, service and emergency positions, a separate brake pipe vent valve, and means for so operating said valves in timed relation that the vent valve is open in emergency position of the main valve; and a changeover device associated with the brake valve and having two settings, in one of which it renders said vent valve effective and conditions the main valve to perform release, lap and service functions by controlling pressure in the brake pipe, and in the other of which settings it charges the brake pipe from said supply, conditions the main valve to perform release lap, service and emergency functions, and renders the emergency vent valves ineffective.

19. The combination of an air supply; a normally charged brake pipe; a normally vented straight air pipe; an engineer's brake valve connected with said pipes and supply and including a main valve having release, lap, service and emergency positions, a separate brake pipe vent valve, and means for so operating said valves in timed relation that the vent valve is open in emergency position of the main valve a changeover device associated with the brake valve and having two settings, in one of which it renders said vent valve effective and conditions the main valve to perform release, lap, and service functions by controlling pressure in the brake pipe, and in the other of which settings it charges the brake pipe from said supply, conditions the main valve to perform release, lap, service and emergency functions, and renders the emergency vent valve ineffective; an application valve for terminating the brake pipe charging flow of air from said supply to said brake valve and changeover device; and a deadman mechanism for actuating said application valve.

20. The combination of an air supply; a normally charged brake pipe; a normally vented straight air pipe; an engineer's brake valve connected with said pipes and supply and including a main valve having release, lap, service and emergency positions; a separate brake pipe vent valve, and means for so operating said valves in timed relation that the vent valve is open in emergency position of the main valve; a changeover device associated with the brake valve and having two settings, in one of which it renders said vent valve effective and conditions the main valve to perform release, lap, and service functions by controlling pressure in the brake pipe, and in the other of which settings it charges the brake pipe from said supply, conditions the main valve to perform release, lap, service and emergency functions, and renders the emergency vent valve ineffective; an application valve for terminating the brake pipe charging flow from said supply to said brake valve and changeover device; and an emergency vent valve adapted to vent the brake pipe, and to cause operation of said application valve in response to a sudden reduction of brake pipe pressure.

21. The combination of an air supply; a normally charged brake pipe; a normally vented straight air pipe; an engineer's brake valve connected with said pipes and supply and including a main valve having release, lap, service and emergency positions, a separate brake pipe vent valve, and means for so operating said valves in timed relation that the vent valve is open in emergency position of the main valve; a changeover device associated with the brake valve and having two settings, in one of which it renders said vent valve effective and conditions the main valve to perform release, lap and service functions by controlling pressure in the brake pipe, and in the other of which settings it charges the brake pipe from said supply, conditions the main valve to perform release, lap, service and emergency functions, and renders the emergency vent valve ineffective; an application valve for terminating the brake pipe charging flow from said supply to said brake valve and changeover device; an emergency vent valve adapted to vent the brake pipe, and to cause operation of said application valve in response to a sudden reduction of brake pipe pressure; and a deadman mechanism adapted when active to cause operation of said application valve and the last-named emergency vent valve.

22. The combination of an air supply; a normally charged brake pipe; a normally vented straight air pipe; an engineer's brake valve connected with said pipes and supply and including a main valve having release, lap, service and emergency positions, a separate brake pipe vent valve, and means for so operating said valves in timed relation that the vent valve is open in emergency position of the main valve; a changeover device associated with the brake valve and having two settings, in one of which it renders said vent valve effective and conditions the main valve to perform release, lap and service functions by controlling pressure in the brake pipe, and in the other of which settings it charges the brake pipe from said supply, conditions the main valve to perform release, lap, service and emergency functions, and renders the emergency vent valve ineffective; a vent valve adapted to respond to a sudden reduction of brake pipe pressure to vent the brake pipe; and an application valve so related to the last-named vent valve as to shift upon operation thereof, such shifting serving to terminate charging flow of air to the brake valve and changeover valve, and supply main air from said supply to the straight air pipe.

23. The combination of an air supply; a normally charged brake pipe; a normally vented straight air pipe; an engineer's brake valve connected with said pipes and supply and including a main valve having release, lap, service and emergency positions, a separate brake pipe vent valve, and means for so operating said valves in timed relation that the vent valve is open in emergency position of the main valve; a changeover device associated with the brake valve and having two settings, in one of which it renders said vent valve effective and conditions the main valve to perform release, lap and service functions by controlling pressure in the brake pipe, and in the other of which settings it charges the brake pipe from said supply, conditions the main valve to perform release, lap, service and emergency functions, and renders the emergency vent valve ineffective; a vent valve adapted to respond to a sudden reduction of brake pipe pressure to vent the brake pipe; an application valve so related to the last-named vent valve as to shift upon operation thereof, such shifting serving to terminate charging flow of air to the brake valve and changeover valve, and supply main air from said supply to the straight air pipe; and a deadman valve, adapted, when active, to cause operation of the last-named vent valve.

24. In an air brake system, the combination of an air supply; a normally charged brake pipe; a normally vented straight air pipe; an engineer's brake valve connected with said pipes and supply; changeover means associated with said valve and adjustable at will selectively to two settings in one of which it conditions the brake valve to control the brakes by varying the pressure in the brake pipe, and in the other of which it conditions the brake valve to control the brakes by establishing pressures in the straight air pipe; and means responsive to a sudden reduction of brake pipe pressure for establishing an emergency pressure in the straight air pipe irrespective of the setting of said changeover mechanism.

25. In an air brake system, the combination of an air supply; a normally charged brake pipe; a normally vented straight air pipe; an engineer's brake valve connected with said pipes and supply; changeover means associated with said valve and adjustable at will selectively to two settings in one of which it conditions the brake valve to control the brakes by varying the pressure in the brake pipe, and in the other of which it conditions the brake valve to control the brakes by establishing pressures in the straight air pipe; means responsive to a sudden reduction of brake pipe pressure for establishing an emergency pressure in the straight air pipe irrespective of the setting of said changeover mechanism; and a deadman mechanism for operating the last-named means.

26. In an air brake system, the combination of an air supply; a normally charged brake pipe; a normally vented straight air pipe; an engineer's brake valve connected with said pipes and supply; changeover means associated with said valve and adjustable at will selectively to two settings in one of which it conditions the brake valve to control the brakes by varying the pressure in the brake pipe, and in the other of which it conditions the brake valve to control the brakes by establishing pressures in the straight air pipe; and means responsive to a sudden reduction of brake pipe pressure for further venting the brake pipe and establishing an emergency pressure in the straight air pipe irrespective of the setting of said changeover mechanism.

27. In a convertible brake system the combination of an air supply; a normally charged brake pipe; a normally vented straight air pipe; an engineer's brake valve connected with said pipes and supply; changeover means associated with the brake valve and adjustable at will selectively to two settings to convert the system from a two pipe straight air system to an automatic system; and means responsive to a sudden reduction of brake pipe pressure and effective in each of said settings to develop an emergency pressure in the straight air pipe.

28. In an air brake system, the combination of an application valve controlling the supply of charging air to the system and adapted to respond to a sudden reduction of brake pipe pressure to terminate such supply; a normally charged brake pipe; a normally vented straight air pipe; an engineer's brake valve connected to air pipe; an engineer's brake valve connected to such pipes; a changeover valve associated with such brake valve and having two settings, in one of which the changeover valve establishes charging flow to the brake pipe and conditions the brake valve to control the brakes by controlling pressures in the straight air pipe, and in the other of which the changeover valve vents the straight air pipe and conditions the brake valve to control charging flow to the brake pipe and to control the brakes by varying brake pipe pressure; and means rendered effective by response of the application valve to a sudden reduction of brake pipe pressure to develop an emergency pressure in the straight air pipe, irrespective of the setting of the changeover valve.

29. In a convertible brake system, the combination of an air supply; a normally charged brake pipe; a normally vented straight air pipe; an engineer's brake valve connected with said pipes and supply; changeover means associated with the brake valve and shiftable between two settings to convert the system from a two pipe straight air system to an automatic system; means responsive to a normal rate of deceleration produced by an application for modulating the brake applying pressure in the straight air pipe; and automatic means responsive to a sudden reduction of brake pipe pressure and effective in each of said settings to develop a pressure in the straight air pipe under the control of said means responsive to deceleration.

30. In a convertible brake system, the combination of an air supply; a normally charged brake pipe; a normally vented straight air pipe; an engineer's brake valve connected with said pipes and supply; changeover means associated with the brake valve and shiftable between two settings to convert the system from a two pipe straight air system to an automatic system; means responsive to a normal rate of deceleration produced by an application for modulating the brake applying pressure in the straight air pipe; automatic means responsive to a sudden reduction of brake pipe pressure and effective in each of said settings to develop a pressure in the straight air pipe under the control of said means responsive to deceleration; and adjusting means rendered effective by the response to said automatic means to delay response of said means responsive to deceleration rate until the deceleration rate exceeds the normal rate.

31. In a two pipe stragiht air system, the combination of an air supply; a brake pipe; a straight air pipe; an engineer's brake valve for controlling pressure in the straight air pipe; and means normally effective to charge the brake pipe and responsive to a sudden reduction of brake pipe pressure to suspend completely the supply of air to the brake pipe, isolate the brake valve from the straight air pipe and supply air to the straight air pipe independently of the brake valve.

32. In a two pipe straight air system, the combination of an air supply; a brake pipe; a straight air pipe; an engineer's brake valve for controlling pressure in the straight air pipe; means responsive to deceleration produced by a brake application for modulating pressure in the straight air pipe whereby a normal deceleration rate is established; adjusting means for setting the last-named means to maintain a higher deceleration rate; and means normally effective to charge the brake pipe and responsive to a sudden reduction of brake pipe pressure to suspend completely the supply of air to the brake pipe, isolate the brake valve from the straight air pipe and supply air to the straight air pipe independently of the brake valve, and actuate said adjusting means to maintain said higher deceleration rate.

33. A brake valve comprising in combination, means affording connections with air supply, brake pipe and straight air pipe; a ported seat; a main valve shiftable on said seat between four positions, namely, release, lap, service and emergency; a brake pipe vent valve arranged to be opened by motion of the main valve to emergency position; and a changeover valve controlling communication to ports in the main valve seat and to the vent valve, certain of said communications leading from said pipes and supply, said changeover valve having a straight air setting in which the communications are such that the main valve alone controls pressure in the straight air pipe, and an automatic setting in which the connections are such that main valve controls brake pipe pressure in release, lap and service positions, and the emergency vent valve vents the brake pipe in emergency position.

34. A brake valve convertible to operate on the straight air or the automatic principles at will, said valve having four functional positions, namely, release, lap, service and emergency, which are the same under the two operating conditions, the valve including a main valve; a seat therefor; an emergency vent valve; connections for operating the vent valve in timed relation with the main valve; an equalizing discharge valve controlled by ports in the main valve; and a changeover valve controlling connections from the brake system to ports in the main valve seat and connections to the vent and equalizing discharge valves, said changeover valve having a straight air setting in which the main valve performs all functions and the vent and equalizing discharge valves are disconnected, and an automatic setting in which the main valve controls charging of the brake pipe in release position, controls the equalizing discharge valve in service position, and the vent valve vents the brake pipe in emergency position.

35. The combination of a main valve seat having a first convertible port, a second convertible port, an equalizing chamber port and a preliminary exhaust port; a main valve shiftable on said ported seat and so ported that in release position it connects said convertible ports together and to the equalizing chamber port and closes the preliminary exhaust port, in lap position it blanks all said ports, in service position it offers a restricted passage through the main valve to the first convertible port, blanks the second convertible port and connects said equalizing chamber port with said preliminary exhaust port, and in emergency position opens a large passage through the valve to the first convertible port, connects the second convertible port with the equalizing chamber port and blanks the preliminary exhaust port; means for supplyng pressure fluid to the back of said main valve; connections for a pressure fluid supply, a brake pipe and a straight air pipe; an equalizing discharge valve mechanism including an equalizing chamber connected with said equalizing port; an emergency vent valve for venting the brake pipe; means for actuating said main valve and said emergency vent valve in such timed relation that the emergency vent valve is open only in emergency position of the main valve; and a changeover valve having a straight air position and an automatic position, said changeover valve serving in straight air position to connect the first convertible port to straight air pipe, the second convertible port to atmosphere and render the emergency vent valve inoperative, and serving in automatic setting to connect the first convertible port to supply, the second convertible port to brake pipe and render the emergency vent valve operative.

36. The combination of a main valve seat having a first convertible port, a second convertible port, an equalizing chamber port, a deceleration control port, a preliminary exhaust port and a supplemental exhaust port; a main valve shiftable on said ported seat and so ported that in release position it connects said convertible ports together and to the equalizing chamber and deceleration control ports and closes said exhaust ports, in lap position it blanks said convertible ports and preliminary exhaust port and connects said equalizing chamber port and deceleration control port with said auxiliary exhaust port, in service position it offers a restricted passage through the main valve to the first convertible port, connects the latter with the deceleration control port, blanks the second convertible port and connects said equalizing chamber port with said exhaust ports, and in emergency position opens a large passage through the valve to the first convertible port and a passage through the valve to the deceleration control port, connects the second convertible port with the equalizing chamber port and blanks both said exhaust ports; means for supplying pressure fluid to the back of said main valve; connections for a pressure fluid supply, a brake pipe and a straight air pipe; an equalizing discharge valve mechanism including an equalizing chamber connected to said equalizing port; an emergency vent valve for venting the brake pipe; means for actuating said main valve and said emergency vent valve in such timed relation that the emergency vent valve is open only in emergency position of the main valve; and a changeover valve having a straight air position and an automatic position, said changeover valve serving in straight air position to connect the first convertible port to straight air pipe, the second convertible port to atmosphere, to open the auxiliary exhaust port, and to render the emergency vent valve inoperative, and serving in automatic setting to connect the first convertible port to supply, the second convertible port to brake pipe, close the auxiliary exhaust port and render the emergency vent valve operative.

37. An engineer's brake valve comprising in combination, a manually operable valve, having release, lap, service, and emergency positions; an emergency brake pipe vent valve arranged to be opened in said emergency position; an equalizing discharge valve mechanism adapted to be controlled by the manually operable valve; means affording connections for brake pipe, straight air pipe, air supply and exhaust; and a changeover valve controlling said connections and having two positions, in one of which the manually operable valve exercises straight air control through the straight air pipe connection and the equalizing discharge valve mechanism is rendered functionless, and in the other of which the manually operable valve exercises automatic control through the brake pipe connection and the equalizing discharge valve mechanism is conditioned to function.

38. The combination of an air supply; a normally charged brake pipe; a normally vented straight air pipe; an engineer's brake valve connected with said pipes and supply and including a main valve having release, lap, service and emergency positions, a separate brake pipe vent valve, and means for so operating said valves in timed relation that the vent valve is open in emergency position of the main valve; and a changeover device associated with the brake valve and having two settings, in one of which it conditions the main valve to perform release, lap and service functions by controlling pressure in the brake pipe, and in the other of which settings it charges the brake pipe from said supply, and conditions the main valve to perform release, lap, service and emergency functions.

39. In a brake system, the combination of a control chamber; brake controlling means responsive to pressures in said chamber; a brake valve serving as a primary means to control pressure in said control chamber; a decelerometer valve mechanism responsive to deceleration produced by a brake application and serving to suspend control by said brake valve of pressure in said chamber and to assume control thereof; pressure operated adjusting means operable to change the deceleration rate at which said decelerometer valve responds; means responsive to rise of pressure in said chamber above a chosen value to admit pressure fluid to said adjusting means; and means rendered effective by the brake valve in at least one operating position to admit pressure fluid to said adjusting means prior to the response of the last named means.

40. The combination defined in claim 39, in which the adjusting means is selectively connected by a double throw check valve with said means responsive to rise of pressure, and said means rendered effective by the brake valve.

41. In a pneumatic brake system, the combination of a normally charged brake pipe; a normally vented straight air pipe; an air supply; an engineer's brake valve mechanism connected with said pipes and supply and having an actuator manually shiftable through a definite range to cause said valve to perform its brake controlling functions; and changeover means operatively associated with said brake valve mechanism and having two positions in which respectively it establishes different control characteristics for said engineer's valve in response to the shifting of said actuator through said range, in one of which the brake valve controls pressure in the straight air pipe and in the other of which it controls pressure in the brake pipe.

42. In a pneumatic brake system, the combination of a normally charged brake pipe; a normally vented straight air pipe; an air supply; an engineer's brake valve mechanism connected with said pipes and supply and having an actuator manually shiftable through a definite normal range to cause said valve to perform its brake controlling functions, and shiftable in a direction transverse to said normal range; a dead man emergency mechanism operatively associated with said brake system and adapted to be operated by such transverse shifting; yielding means urging said actuator in a direction to render said dead man emergency mechanism active; and changeover means operatively associated with said brake valve mechanism and having two positions in which respectively it establishes different control characteristics for said engineer's valve in response to shifting of said actuator in said normal range, while the dead man emergency mechanism continues its operative relationship with said actuator, under one of which the brake valve controls control characteristics pressure in the straight air pipe and under the other of which control characteristics it controls pressure in the brake pipe.

CHARLES A. CAMPBELL.